(12) United States Patent
Zhao et al.

(10) Patent No.: US 10,798,382 B2
(45) Date of Patent: Oct. 6, 2020

(54) SUB-BLOCK TRANSFORM

(71) Applicant: TENCENT AMERICA LLC, Palo Alto, CA (US)

(72) Inventors: Xin Zhao, San Diego, CA (US); Xiang Li, Los Gatos, CA (US); Shan Liu, San Jose, CA (US); Liang Zhao, Sunnyvale, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/212,094

(22) Filed: Dec. 6, 2018

(65) Prior Publication Data

US 2019/0335172 A1    Oct. 31, 2019

Related U.S. Application Data

(60) Provisional application No. 62/663,179, filed on Apr. 26, 2018.

(51) Int. Cl.
| | | |
|---|---|---|
| *H04N 19/119* | (2014.01) | |
| *H04N 19/159* | (2014.01) | |
| *H04N 19/176* | (2014.01) | |
| *H04N 19/64* | (2014.01) | |
| *H04N 19/12* | (2014.01) | |
| *H04N 19/44* | (2014.01) | |

(52) U.S. Cl.
CPC .......... *H04N 19/119* (2014.11); *H04N 19/12* (2014.11); *H04N 19/159* (2014.11); *H04N 19/176* (2014.11); *H04N 19/44* (2014.11); *H04N 19/64* (2014.11)

(58) Field of Classification Search
CPC .... H04N 19/119; H04N 19/12; H04N 19/159; H04N 19/176; H04N 19/44; H04N 19/64
See application file for complete search history.

(56) References Cited

U.S. PATENT DOCUMENTS

| | | | |
|---|---|---|---|
| 9,674,530 B1* | 6/2017 | Bultje | H04N 19/176 |
| 2013/0064292 A1* | 3/2013 | Song | H04N 19/176 |
| | | | 375/240.03 |
| 2015/0010062 A1* | 1/2015 | Gokhale | H04N 19/61 |
| | | | 375/240.03 |
| 2015/0030067 A1* | 1/2015 | Zhao | H04N 19/176 |
| | | | 375/240.02 |

(Continued)

OTHER PUBLICATIONS

"Asymmetric Partitioning with Non-power-of-two Transform for Intra Coding", Kawamura et al. 2012 Picture Coding symposium, May 7-9, 2012, Krakow, Poland.*

(Continued)

*Primary Examiner* — Mohammed S Rahaman
(74) *Attorney, Agent, or Firm* — Sughrue Mion, PLLC

(57) ABSTRACT

A method of and an apparatus for controlling intra and/or inter prediction for decoding of a video sequence are provided. The method includes determining whether a width or a height of a coding unit is a power of two, and based on the width or the height of the coding unit being determined to not be a power of two, splitting the coding unit into sub-blocks, each of the sub-blocks having a width or a height that is a power of two and maximized, so that a number of the sub-blocks is minimized. The method further includes applying the intra and/or inter prediction on the sub-blocks into which the coding unit is split.

20 Claims, 12 Drawing Sheets

(56) References Cited

U.S. PATENT DOCUMENTS

| | | | | |
|---|---|---|---|---|
| 2015/0092862 A1* | 4/2015 | Yu | ............... | H04N 19/503 |
| | | | | 375/240.18 |
| 2017/0094286 A1* | 3/2017 | Gu | ............... | H04N 19/176 |
| 2018/0109812 A1* | 4/2018 | Tsai | ............. | H04N 19/119 |
| 2018/0278958 A1* | 9/2018 | Hsiang | ............ | H04N 19/157 |

OTHER PUBLICATIONS

Liu, et al., "Rectangular (2NxN and Nx2N) Intra Prediction", Joint Collaborative Team on Video Coding (JCT-VC) of ITU-T SG16 WP3 and ISO/IEC JTC1/SC29/WG11, MediaTek USA Inc., Nov. 2011 (6 pages).

He, et al., "AHG16 Unification of SDIP and NSQT", Joint Collaborative Team on Video Coding (JCT-VC) of ITU-T SG16 WP3 and ISO/IEC JTC1/SC29/WG11, Tsinghua, USTC, HiSilicon, Microsoft, Huawei, LG, Qualcomm, Sony, MediaTek, Feb. 2012 (9 pages).

Albrecht, et al., "Description of SDR, HDR, and 360° video coding technology proposal by Fraunhofer HHI", Fraunhofer HHI, Apr. 2018 (122 pages).

Bordes, et al., "Description of SDR, HDR and 360° video coding technology proposal by Qualcomm and Technicolor—medium complexity version", Joint Video Experts Team (JVET) of ITU-T SG 16 WP 3 and ISO/IEC JTC 1/SC 29/WG 11, Qualcomm, Technicolor, Apr. 2018 (84 pages).

Liu, et al., "Rectangular Partitioning for Intra Prediction in Hevc", MediaTek USA Inc. (6 pages).

* cited by examiner

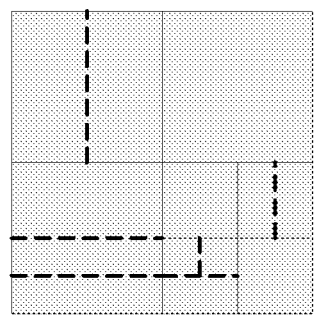
FIG. 1A
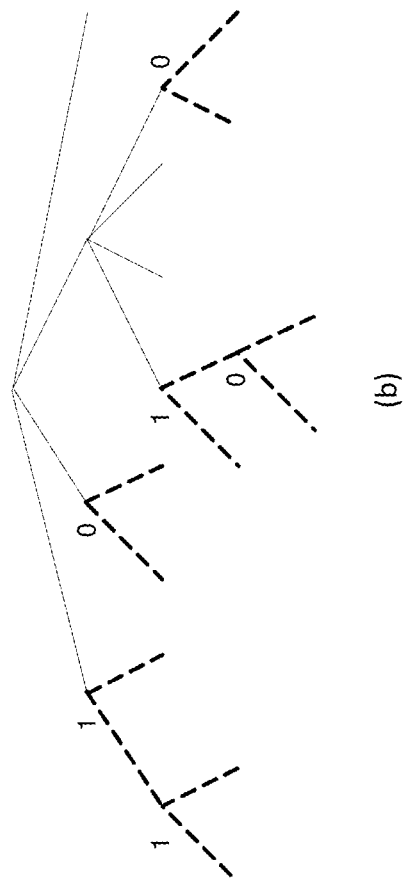
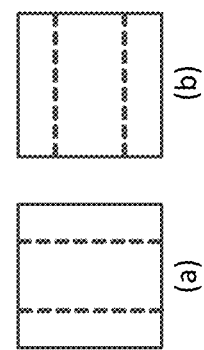
FIG. 1B

FIG. 5   Encoder 303

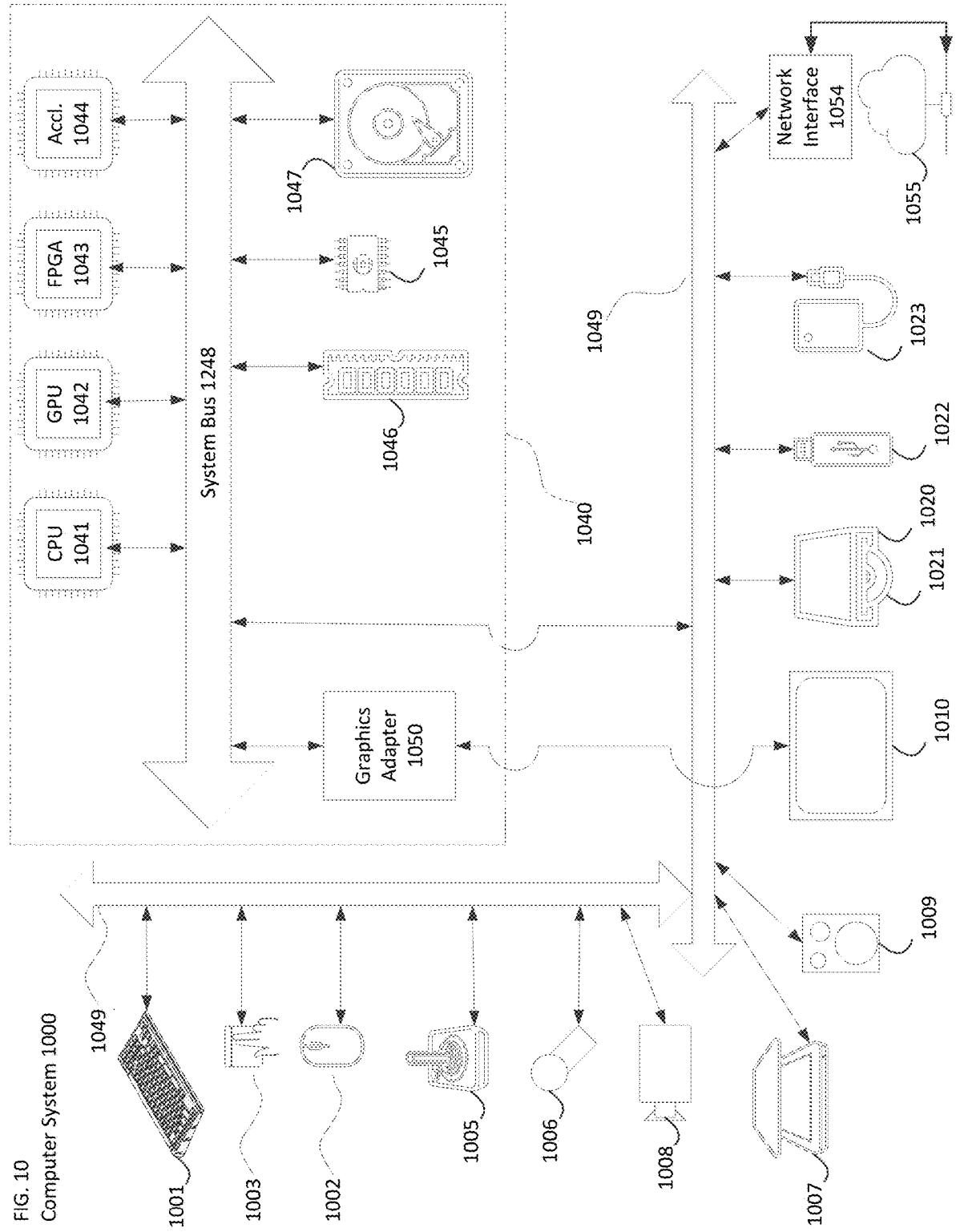

SUB-BLOCK TRANSFORM

CROSS-REFERENCE TO RELATED APPLICATION

This application claims priority from U.S. Provisional Patent Application No. 62/663,179, filed on Apr. 26, 2018, in the United States Patent and Trademark Office, which is incorporated herein by reference in its entirety.

BACKGROUND

1. Field

Methods and apparatuses consistent with embodiments relate to video processing, and more particularly, a sub-block transform.

2. Description of Related Art

In High Efficiency Video Coding (HEVC), a coding tree unit (CTU) is split into coding units (CUs) by using a quadtree structure denoted as a coding tree to adapt to various local characteristics. The decision whether to code a picture area using inter-picture (temporal) or intra-picture (spatial) prediction is made at a CU level. Each CU can be further split into one, two or four prediction units (PUs) according to a PU splitting type. Inside one PU, the same prediction process is applied and relevant information is transmitted to a decoder on a PU basis. After obtaining a residual block by applying the prediction process based on the PU splitting type, a CU can be partitioned into transform units (TUs) according to another quadtree structure similar to the coding tree for the CU. One feature of an HEVC structure is that it has multiple partition conceptions including CU, PU, and TU. In HEVC, a CU or a TU can only be a square shape, while a PU may be a square or rectangular shape for an inter predicted block. In a later stage of HEVC, some proposed to allow rectangular shape PUs for intra prediction and transform. These proposals were not adopted to HEVC but extended to be used in Joint Exploration Model (JEM).

At a picture boundary, HEVC imposes an implicit quadtree split so that a block will keep quadtree splitting until a size fits the picture boundary.

A quadtree plus binary tree (QTBT) structure removes concepts of multiple partition types, i.e., removes a separation of CU, PU and TU concepts, and supports more flexibility for CU partition shapes. In the QTBT structure, a CU can have either a square or rectangular shape.

FIG. 1A is a diagram of the QTBT structure.

Referring to FIG. 1A, a CTU is first partitioned by a quadtree structure. Quadtree leaf nodes are further partitioned by a binary tree structure. There are two splitting types, symmetric horizontal splitting and symmetric vertical splitting, in a binary tree splitting. Binary tree leaf nodes are called CUs, and that segmentation is used for prediction and transform processing without any further partitioning. This means that a CU, a PU and a TU have the same block size in the QTBT coding block structure. In the JEM, a CU sometimes consists of coding blocks (CBs) of different colour components, e.g., one CU contains one luma CB and two chroma CBs in a case of P and B slices of a 4:2:0 chroma format, and the CU sometimes consists of a CB of a single component, e.g., one CU contains only one luma CB or just two chroma CBs in a case of I slices.

The following parameters are defined for a QTBT partitioning scheme.
CTU size: a root node size of a quadtree, the same concept as in HEVC
MinQTSize: a minimum allowed quadtree leaf node size
MaxBTSize: a maximum allowed binary tree root node size
MaxBTDepth: a maximum allowed binary tree depth
MinBTSize: a minimum allowed binary tree leaf node size In an example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. Each of the quadtree leaf nodes may have a size from 16×16 (i.e., the MinQTSize) to 128×128 (i.e., the CTU size). If a size of a quadtree leaf node is 128×128, it will not be further split by a binary tree because the size exceeds the MaxBTSize (i.e., 64×64). Otherwise, the quadtree leaf node could be further partitioned by the binary tree. Therefore, the quadtree leaf node is also a root node for the binary tree, and it has the binary tree depth as 0. When the binary tree depth reaches the MaxBTDepth (i.e., 4), no further splitting is considered. When a binary tree node has a width equal to the MinBTSize (i.e., 4), no further horizontal splitting is considered. Similarly, when the binary tree node has a height equal to the MinBTSize, no further vertical splitting is considered. Leaf nodes of the binary tree are further processed by prediction and transform processing without any further partitioning. In the JEM, a maximum CTU size is 256×256 luma samples.

Portion (a) of FIG. 1A illustrates an example of block partitioning by using QTBT, and portion (b) of FIG. 1A illustrates a corresponding tree representation. Solid lines indicate quadtree splitting and dotted lines indicate binary tree splitting. In each splitting (i.e., non-leaf) node of a binary tree, one flag is signalled to indicate which splitting type (i.e., horizontal or vertical) is used, where 0 indicates horizontal splitting and 1 indicates vertical splitting. For the quadtree splitting, there is no need to indicate a splitting type because the quadtree splitting always splits a block both horizontally and vertically to produce 4 sub-blocks with an equal size.

In addition, the QTBT scheme supports an ability for luma and chroma to have a separate QTBT structure. Currently, for P and B slices, luma and chroma CTBs in one CTU share a same QTBT structure. However, for I slices, a luma CTB is partitioned into CUs by a QTBT structure, and chroma CTBs are partitioned into chroma CUs by another QTBT structure. This means that a CU in an I slice consists of a coding block of a luma component or coding blocks of two chroma components, and a CU in a P or B slice consists of coding blocks of all three colour components.

In HEVC, inter prediction for small blocks is restricted to reduce memory access of motion compensation, such that bi-prediction is not supported for 4×8 and 8×4 blocks, and inter prediction is not supported for 4×4 blocks. In the QTBT as implemented in the JEM, these restrictions are removed.

A block partitioning structure may use a ternary tree (TT). In detail, a multi-type tree (MTT) is a more flexible tree structure than QTBT. In MTT, other than quadtrees and binary trees, horizontal and vertical center-side triple-trees are introduced, as shown in portions (a) and (b) of FIG. 1B.

FIG. 1B is a diagram of vertical center-side triple-tree partitioning and horizontal center-side triple-tree partitioning.

Referring to FIG. 1B, portion (a) shows vertical center-side triple-tree partitioning, and portion (b) shows horizontal center-side triple-tree partitioning.

Key benefits of the triple-tree partitioning are as follows:

The triple-tree partitioning is a complement to quadtree and binary tree partitioning and is able to capture objects that are located in a block center, while quadtree and binary tree are always splitting along a block center.

A width and a height of partitions of the proposed triple-trees are always a power of 2 so that no additional transforms are needed.

A design of a two-level tree is mainly motivated by complexity reduction. Theoretically, a complexity of traversing of a tree is $T^D$, where T denotes a number of split types, and D is a depth of the tree.

FIGS. 1C and 1D are diagrams of supported splits for block sizes that represent integer powers of 2.

A generalized binary splitting or a binary tree with shifting (BTS) has been proposed. Each block is either not split or is split into two rectangular blocks (either in a horizontal direction or a vertical direction). Both a width and a height (in luma samples) of resulting CUs must represent integer multiples of 4. dim represents a width (for vertical splits) or a height (for horizontal splits), in luma samples, of a block to be split. For both split directions, the following splits are supported (see illustrations in FIGS. 1C and 1D):

½ split (a first row in FIG. 1C): This split is supported if dim≥k·8, k∈ℕ. It is similar to a binary split for QTBT in JEM.

¼ split and ¾ split (a second row in FIG. 1C): These splits are supported if dim represents an integer power of two (dim=$2^n$, n∈ℕ) and dim≥16.

⅜ split and ⅝ split (a third row in FIG. 1C): These splits are supported if dim represents an integer power of two (dim=2n, n∈ℕ) and dim≥32.

⅓ split and ⅔ split (a first row in FIG. 1D): These splits are supported if dim=3·$2^n$, n∈ℕ and dim≥12.

⅕ split, ⅖ split, ⅗ split and ⅔ split (second and third rows in FIG. 1D): These splits are supported if dim=5·$2^n$, n∈ℕ and dim≥20.

At this, the following convention is used. An n/m horizontal split specifies a split for which a ratio of a height of a first resulting block (top block) and a height of a block to be split is equal to n/m. Similarly, an n/m vertical split specifies a split for which a ratio of a width of a first resulting block (left block) and a width of a block to be split is equal to n/m. If a size of a side to be split is not equal to $2^n$, n∈ℕ, then it is either equal to 3·$2^n$, n∈ℕ or 5·$2^n$, n∈ℕ.

A binary split is uniquely determined by its split direction and its split ratio. A direction of binary splits is coded depending on a previous split, i.e., instead of being signaled as a horizontal or vertical split, they are signaled as a perpendicular or parallel split that, however, can always be translated to a horizontal or vertical split. At a root level, no previous split was signaled, and a first perpendicular split is a horizontal split and a first parallel split is a vertical split. A binary flag perpend_split_flag distinguishes two possible directions (perpendicular and parallel). A split ratio then describes a location where to split (see FIGS. 1C and 1D). It is coded using a binary decision tree. A full signaling tree for binary splits with shifting, without any restrictions, is shown in FIG. 1D. Both, the split direction as well as the split ratio are coded using context-based adaptive arithmetic coding (CABAC). A counting of a binary tree depth starts with a first split that is not a perpendicular ½ split.

FIG. 1E is a diagram of split modes (tree types) in an asymmetric binary tree (ABT) block partitioning structure.

The ABT block partitioning structure has also been proposed. As shown in FIG. 1E, a block can be partitioned using 1:3 or 3:1 partitions, e.g., HOR_UP, HOR_DOWN, VER_LEFT, VER_RIGHT. For both BTS and ABT, a width or a height of a partition can be a non-power-of-2.

In addition to Discrete Cosine Transform (DCT)-II and 4×4 Discrete Sine Transform (DST)-VII that have been employed in HEVC, an Adaptive Multiple Transform (AMT) or Enhanced Multiple Transform (EMT) scheme is used for residual coding for both inter and intra coded blocks. The AMT scheme uses multiple selected transforms from DCT/DST families other than current transforms in HEVC. Newly introduced transform matrices are DST-VII, DCT-VIII, DST-I and DCT-V. Table 1 shows basis functions of the selected DST/DCT.

TABLE 1

Transform basis functions of DCT-II/V/VIII and DST-I/VII for N-point input

| Transform Type | Basis function $T_i(j)$, i, j = 0, 1, ..., N-1 |
| --- | --- |
| DCT-II | $T_i(j) = \omega_0 \cdot \sqrt{\dfrac{2}{N}} \cdot \cos\left(\dfrac{\pi \cdot i \cdot (2j+1)}{2N}\right)$ where $\omega_0 = \begin{cases} \sqrt{\dfrac{2}{N}} & i=0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$, where $\omega_0 = \begin{cases} \sqrt{\dfrac{2}{N}} & i=0 \\ 1 & i \neq 0 \end{cases}$, $\omega_1 = \begin{cases} \sqrt{\dfrac{2}{N}} & j=0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

To keep an orthogonality of a transform matrix, transform matrices are quantized more accurately than transform matrices in HEVC, with a 10-bit representation instead of an 8-bit representation in HEVC. To keep intermediate values of transformed coefficients within a range of 16-bit, after horizontal and vertical transforms, all the coefficients are right shifted by 2 more bits, comparing to a right shift used in current HEVC transforms.

The AMT applies to CUs with both a width and a height smaller than or equal to 64, and whether the AMT applies or not is controlled by a CU level flag. When the CU level flag is equal to 0, DCT-II is applied in a CU to encode a residue. For a luma coding block within an AMT-enabled CU, two additional flags are signalled to identify horizontal and vertical transforms to be used. As in HEVC, a residual of a block can be coded with a transform skip mode in the JEM. To avoid a redundancy of syntax coding, a transform skip flag is not signalled when a CU-level AMT flag is not equal to zero.

For intra residue coding, due to different residual statistics of different intra prediction modes, a mode-dependent transform candidate selection process is used. Three transform subsets are defined as shown in Table, and a transform subset is selected based on an intra prediction mode, as specified in Table 2.

TABLE 2

Three pre-defined transform candidate sets

| Transform Set | Transform Candidates |
|---|---|
| 0 | DST-VII, DCT-VIII |
| 1 | DST-VII, DST-I |
| 2 | DST-VII, DCT-VIII |

With a subset concept, a transform subset is first identified based on Table 2 using an intra prediction mode of a CU with a CU-level AMT flag that is equal to 1. After that, for each of a horizontal and vertical transform, one of two transform candidates in the identified transform subset, according to Table 3, is selected based on explicitly signalled with flags.

TABLE 3

Selected (H)orizontal and (V)ertical transform sets for each intra prediction mode

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |

| Intra Mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| V | 0 | 0 | 0 | 0 | 0 | 1 | 0 | 1 | 0 | 1 | 0 | 1 | 0 | 1 | 0 | 1 | 0 |
| H | 2 | 2 | 2 | 2 | 2 | 1 | 0 | 1 | 0 | 1 | 0 | 1 | 0 | 1 | 0 | 1 | 0 |

| Intra Mode | 35 | 36 | 37 | 38 | 39 | 40 | 41 | 42 | 43 | 44 | 45 | 46 | 47 | 48 | 49 | 50 | 51 | 52 |
|---|---|---|---|---|---|---|---|---|---|---|---|---|---|---|---|---|---|---|
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |

| Intra Mode | 53 | 54 | 55 | 56 | 57 | 58 | 59 | 60 | 61 | 62 | 63 | 64 | 65 | 66 |
|---|---|---|---|---|---|---|---|---|---|---|---|---|---|---|
| V | 2 | 2 | 1 | 0 | 1 | 0 | 1 | 0 | 1 | 0 | 1 | 0 | 1 | 0 |
| H | 0 | 0 | 1 | 0 | 1 | 0 | 1 | 0 | 1 | 0 | 1 | 0 | 1 | 0 |

For an inter prediction residual, however, only one transform set, which consists of DST-VII and DCT-VIII, is used for all inter modes and for both horizontal and vertical transforms.

A complexity of the AMT is relatively high at an encoder side, because a total of five different transform candidates (DCT-II and four multiple transform candidates) need to be evaluated with a rate-distortion cost for each residual block when a brute-force search is used. To alleviate this complexity issue at the encoder, several optimization methods are designed for algorithm acceleration in the JEM.

For both the BTS and ABT, a width or height of a partition can be a non-power-of-2, e.g., 6, 12, 20, 24. This inevitably introduces use of a non-power-of-2 transform, which increases transform cores, requires separate functions/modules to handle the non-power-of-2 transform. Further, when the width or height of the partition can be the non-power-of-2, there may be more cases of division operations, e.g., Planar mode, DC mode, and strong intra smoothing.

SUMMARY

According to embodiments, a method of controlling intra and/or inter prediction for decoding of a video sequence, is performed by at least one processor and includes determining whether a width or a height of a coding unit is a power of two, and based on the width or the height of the coding unit being determined to not be a power of two, splitting the coding unit into sub-blocks, each of the sub-blocks having a width or a height that is a power of two and maximized, so that a number of the sub-blocks is minimized. The method further includes applying the intra and/or inter prediction on the sub-blocks into which the coding unit is split.

According to embodiments, an apparatus for controlling intra and/or inter prediction for decoding of a video sequence, includes at least one memory configured to store computer program code, and at least one processor configured to access the at least one memory and operate according to the computer program code. The computer program code includes first determining code configured to cause the at least one processor to determine whether a width or a height of a coding unit is a power of two, and splitting code configured to cause the at least one processor to, based on the width or the height of the coding unit being determined to not be a power of two, split the coding unit into sub-blocks, each of the sub-blocks having a width or a height that is a power of two and maximized, so that a number of the sub-blocks is minimized. The computer program code further includes first applying code configured to cause the at least one processor to apply the intra and/or inter prediction on the sub-blocks into which the coding unit is split.

According to embodiments, a non-transitory computer-readable storage medium stores instructions that cause a processor to determine whether a width or a height of a coding unit is a power of two, and based on the width or the height of the coding unit being determined to not be a power of two, split the coding unit into sub-blocks, each of the sub-blocks having a width or a height that is a power of two and maximized, so that a number of the sub-blocks is minimized. The instructions further cause the processor to apply intra and/or inter prediction for decoding of a video sequence, on the sub-blocks into which the coding unit is split.

BRIEF DESCRIPTION OF THE DRAWINGS

FIG. 1A is a diagram of a QTBT structure.

FIG. 1B is a diagram of vertical center-side triple tree partitioning and horizontal center-side triple tree partitioning.

FIG. 10 is a diagram of a computer system suitable for implementing embodiments.

DETAILED DESCRIPTION

Embodiments are directed to next-generation video coding technologies beyond HEVC, e.g., Versatile Video Coding (VVC). More specifically, a transform scheme for a block with a width or height that is not a power of 2 is described, and a transform scheme for a transform block being smaller than a coding block is also described.

Methods described herein may be used separately or combined in any order. Further, the methods may be implemented by processing circuitry (e.g., one or more processors or one or more integrated circuits). In an example, the one or more processors execute a program that is stored in a non-transitory computer-readable medium.

In this description, a non-power-of-2 block indicates a block of which a width and/or a height are not a power of 2.

Figure 1C:
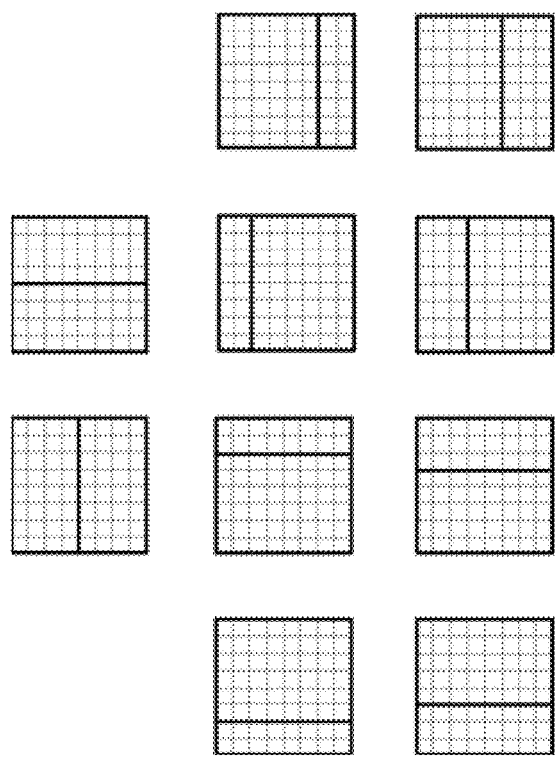
FIGS. 1C and 1D are diagrams of supported splits for block sizes that represent integer powers of 2.
Figure 1D:
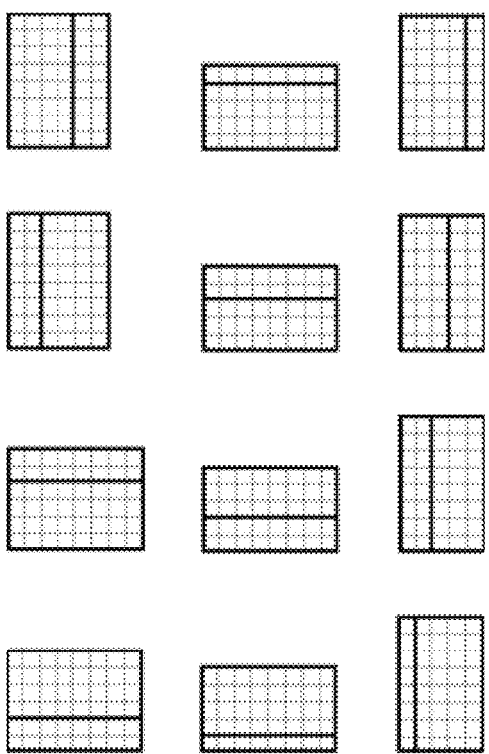
Figure 1E:
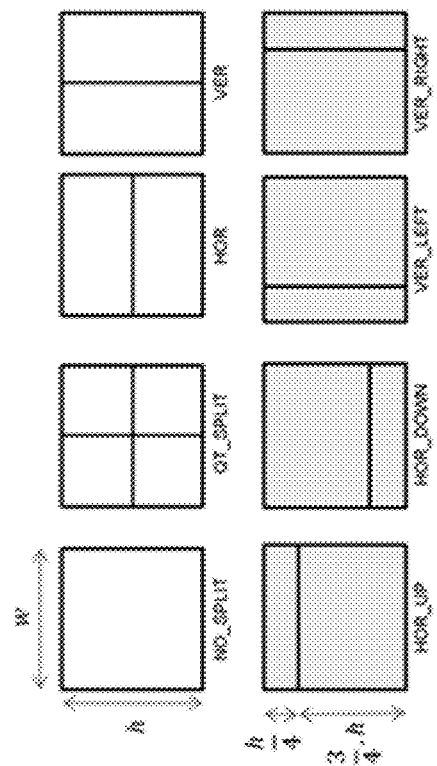
FIG. 1E is a diagram of split modes (tree types) in an ABT block partitioning structure.
Figure 2:
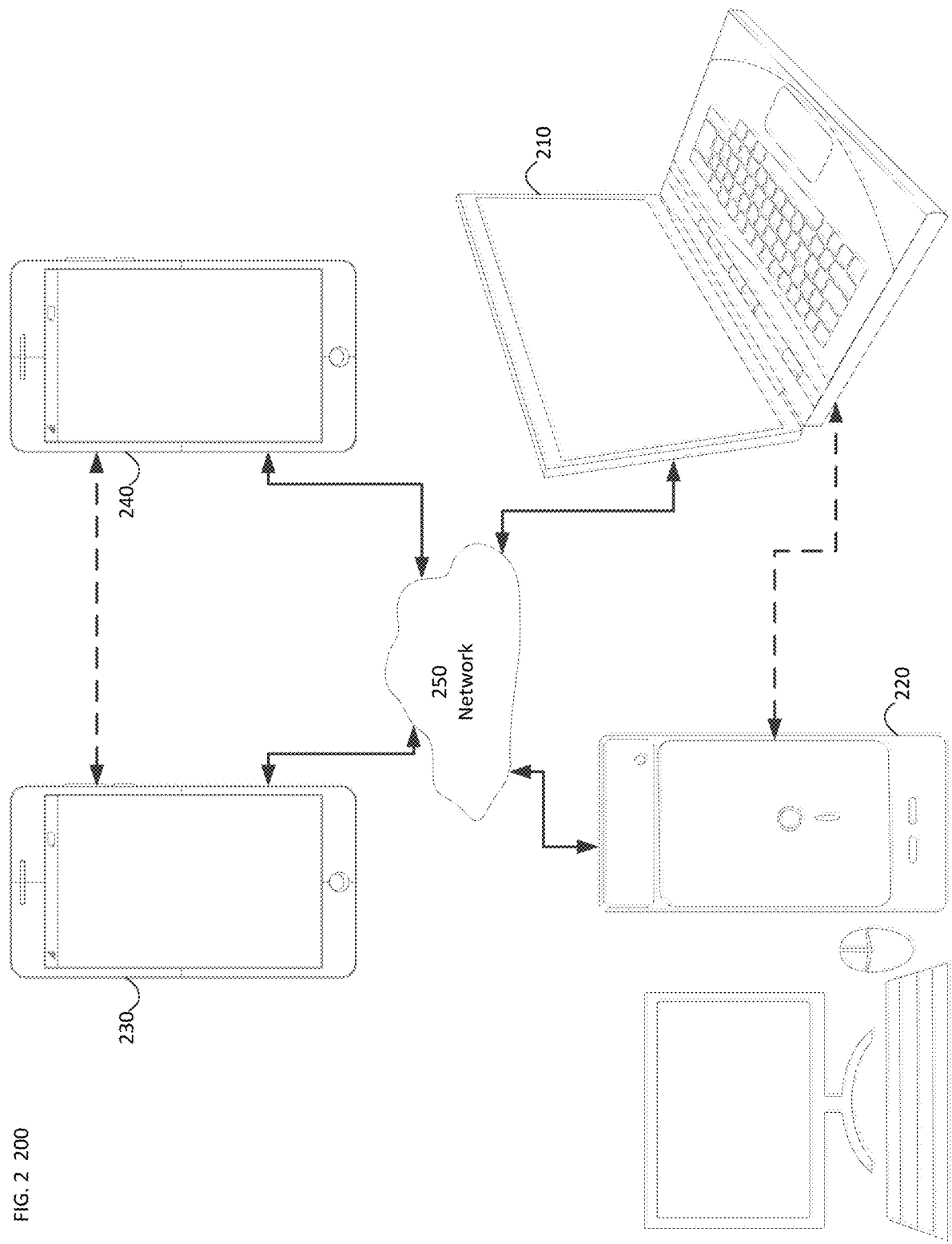
FIG. 2 is a simplified block diagram of a communication system according to an embodiment.

FIG. 2 is a simplified block diagram of a communication system (200) according to an embodiment. The communication system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of embodiments are not so limited. Embodiments find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of embodiments unless explained herein below.

Figure 3:
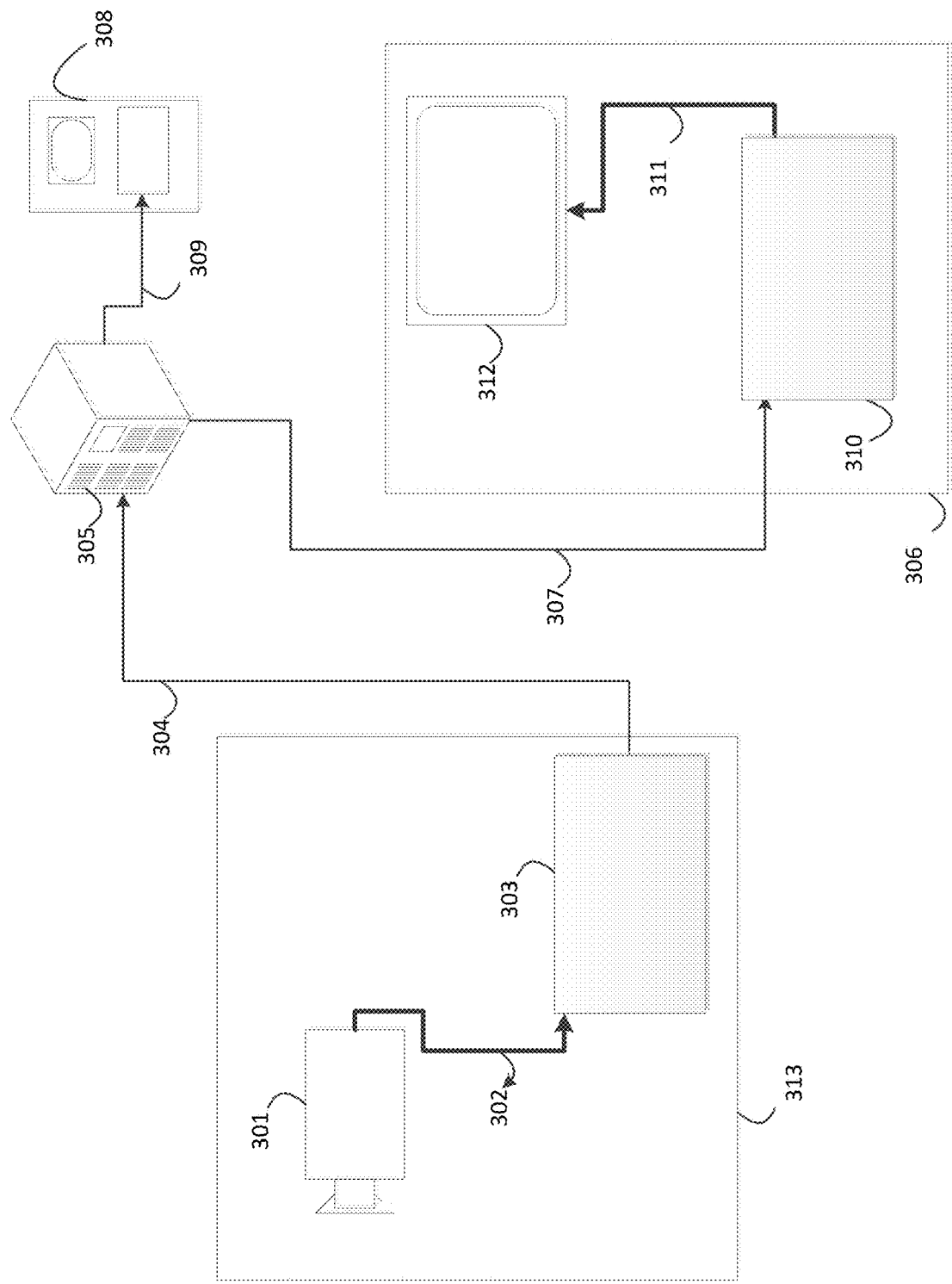
FIG. 3 is a diagram of a placement of a video encoder and a video decoder in a streaming environment, according to an embodiment.

FIG. 3 is a diagram of a placement of a video encoder and a video decoder in a streaming environment, according to an embodiment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313) that can include a video source (301), for example a digital camera, creating, for example, an uncompressed video sample stream (302). That sample stream (302), depicted as a bold line to emphasize a high data volume when compared to encoded video bitstreams, can be processed by an encoder (303) coupled to the camera (301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310) which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as VVC. The disclosed subject matter may be used in the context of VVC.

Figure 4:
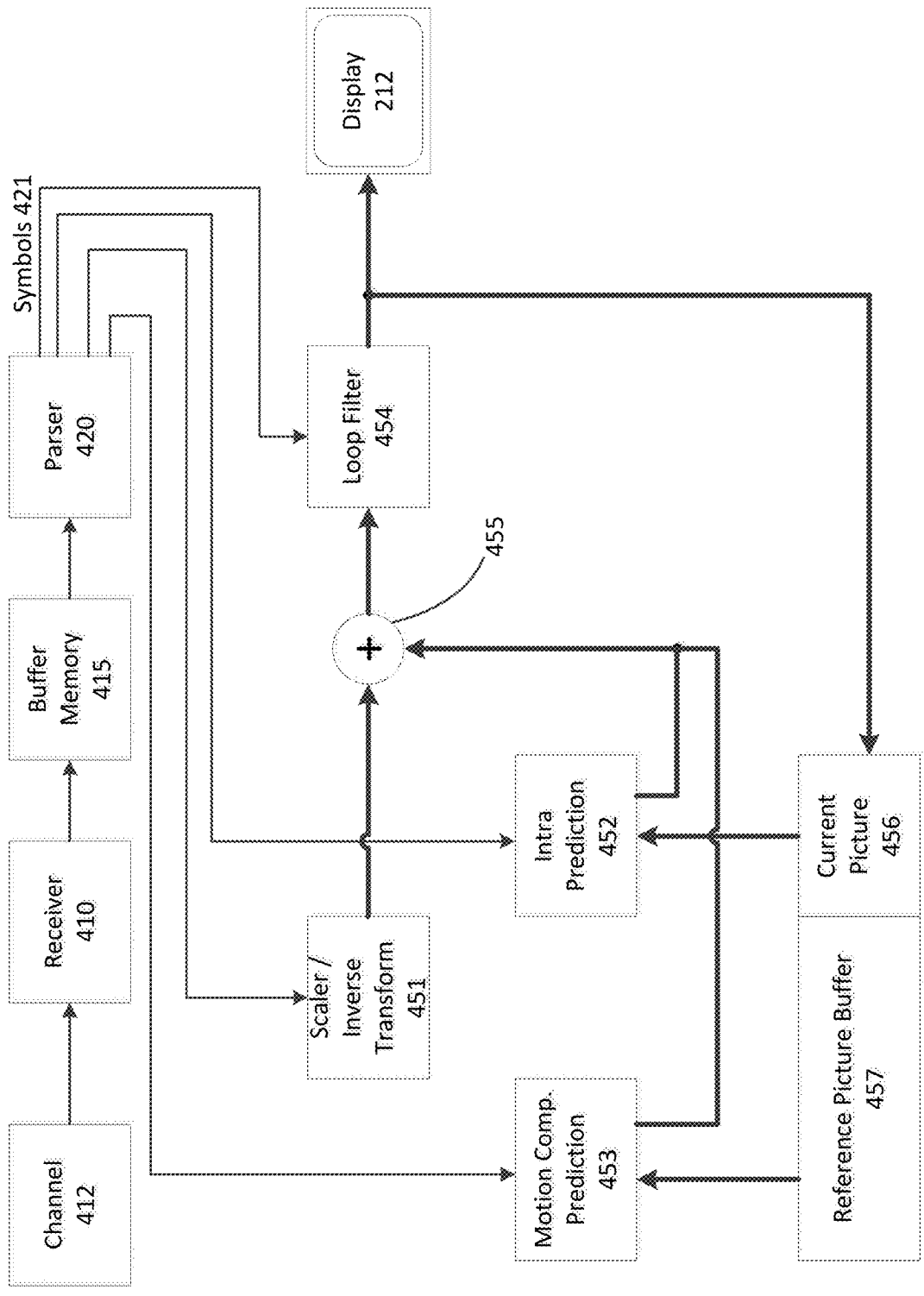
FIG. 4 is a functional block diagram of a video decoder according to an embodiment.

FIG. 4 is a functional block diagram of a video decoder (310) according to an embodiment.

A receiver (410) may receive one or more codec video sequences to be decoded by the decoder (310); in the same or an embodiment, one coded video sequence at a time, where the decoding of each coded video sequence is independent from other coded video sequences. The coded video sequence may be received from a channel (412), which may be a hardware/software link to a storage device which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosychronous network, the buffer (415) may not be needed, or can be small. For use on best effort packet networks such as the Internet, the buffer (415) may be required, can be comparatively large and can advantageously of adaptive size.

The video decoder (310) may include a parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 4. The control information for the rendering device(s) may be in the form of Supplementary Enhancement Information (SEI messages) or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, CUs, blocks, TUs, PUs and so forth. The entropy decoder/parser may also extract from the coded video sequence information such as transform coefficients, quantizer parameter (QP) values, motion vectors, and so forth.

The parser (420) may perform entropy decoding/parsing operation on the video sequence received from the buffer (415), so to create symbols (421). The parser (420) may receive encoded data, and selectively decode particular symbols (421). Further, the parser (420) may determine whether the particular symbols (421) are to be provided to a Motion Compensation Prediction unit (453), a scaler/inverse transform unit (451), an Intra Prediction unit (452), or a loop filter unit (454).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (421) from the parser (420). It can output blocks comprising sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (456). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (454). Video compression technologies can include in-loop filter technologies that are controlled by parameters included in the coded video bitstream and made available to the loop filter unit (454) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (454) can be a sample stream that can be output to the render device (312) as well as stored in the reference picture memory (456) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (456) can become part of the reference picture buffer (457), and a fresh current picture memory can be reallocated before commencing the reconstruction of the following coded picture.

The video decoder (310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (410) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 5:
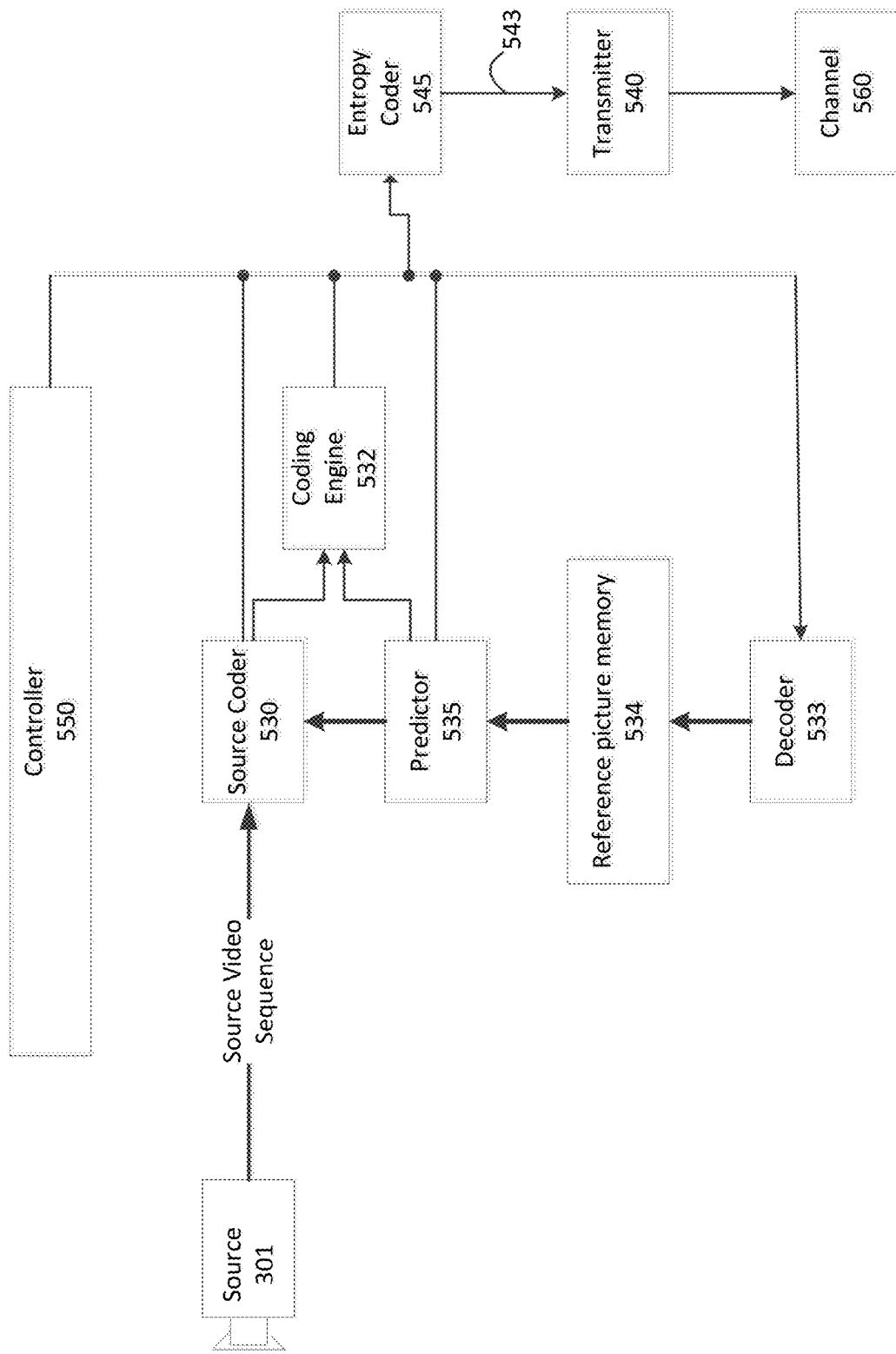
FIG. 5 is a functional block diagram of a video encoder according to an embodiment.

FIG. 5 is a functional block diagram of a video encoder (303) according to an embodiment.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (303) may code and compress the pictures of the source video sequence into a coded video sequence (543) in real time or under any other time constraints as required by the application. Enforcing appropriate coding speed is one function of Controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the art readily recognizes as a "coding loop." As an over-simplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 4, however, as symbols are available and en/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 4), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device that may store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The video coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 6:
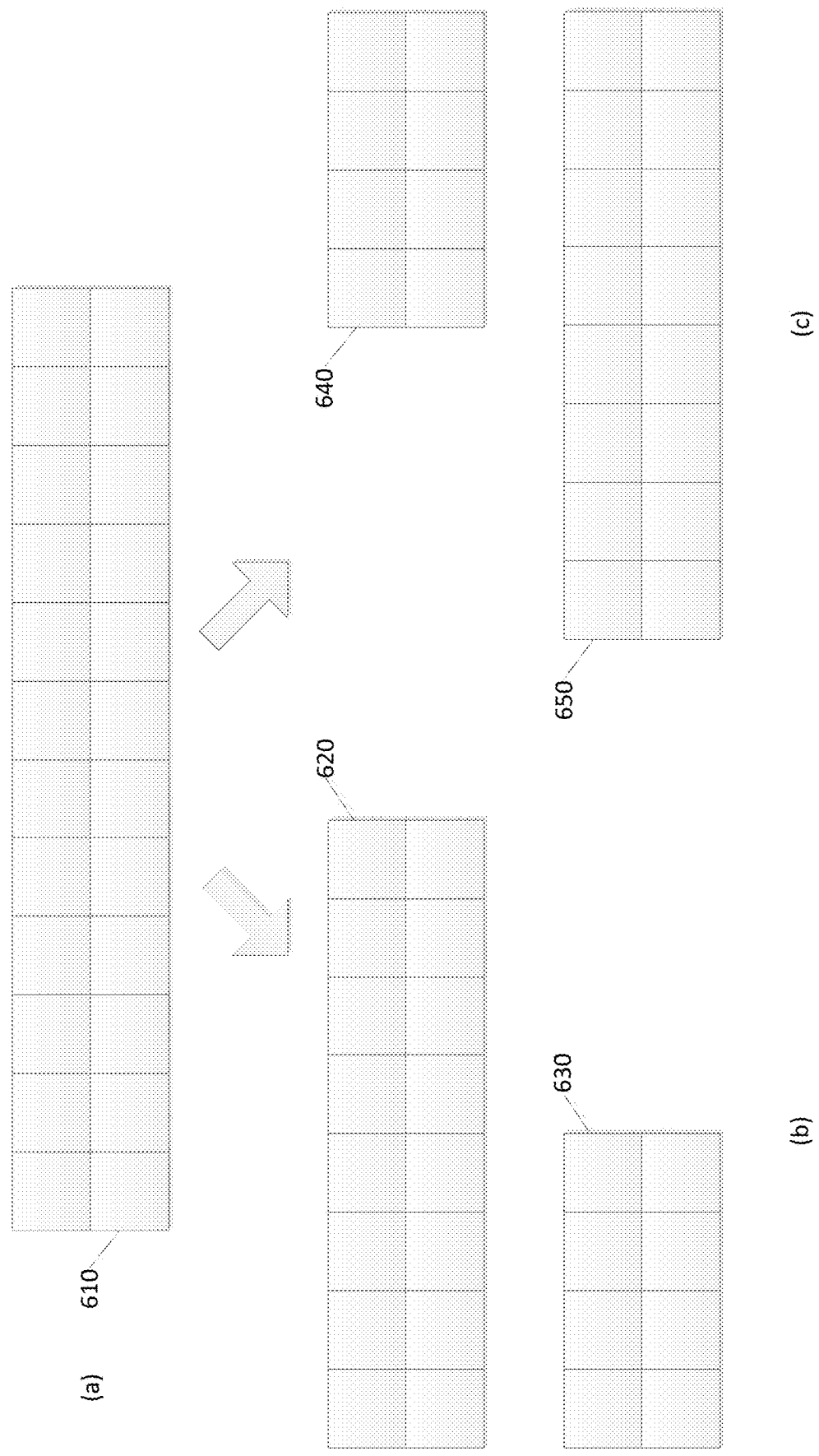
FIG. 6 is a diagram illustrating splitting of a non-power-of-2 block, according to an embodiment.

FIG. 6 is a diagram illustrating splitting of a non-power-of-2 block, according to an embodiment.

For a non-power-of-2 block, the block is split horizontally or vertically into multiple sub-blocks of which a width or height is a power of 2, and a primary transform is performed on each sub-block.

In an embodiment, a block having a width or height value is split into multiple sub-blocks each having a width or height that is a power of 2, and the splitting is performed in a way that a number of sub-blocks is minimized, or the width or height of each sub-block is maximized.

In an example, for the width or height being 6, 12, 20, 24, 28, 36, 40, 44, 48, 52, 56, or 60, the block may be split into 4+2, 8+4, 16+4, 16+8, 16+8+4, 32+4, 32+8, 32+8+4, 32+16, 32+16+4, 32+16+8 and 32+16+8+4 sub-blocks horizontally or vertically, respectively, where M+N+K+J means a block is split to 4 sub-blocks horizontally or vertically with a width or height being M, N, K and J, respectively.

Referring to portions (a) and (b) of FIG. 6, a block 610 having a block width of 12, which is not a power of 2, may be split into sub-blocks 620 and 630 having a width of 8 and 4, respectively.

In an embodiment, a block having a width or height value may be split to multiple sub-blocks each having a width or height that is a power of 2, and a spatial order on how to arrange these sub-blocks can be signaled or implicitly derived. The spatial order specifies a relative location of these sub-blocks. For example, a 12×8 block can be split to one 8×8 block and one 4×8 block from left to right, or can be split to one 4×8 block and one 8×8 block from left to right.

Referring to portions (a) and (c) of FIG. 6, the block 610 having the block width of 12, which is not a power of 2, may be split into the two sub-blocks 620 and 630 having the width of 8 and 4, respectively, or may be split into two sub-blocks 640 and 650 having the width of 4 and 8, respectively, based on a signal or decoded information, including but not limited to, neighboring block partition sizes, a relative location within a CTU, a parent block (i.e., up one quadtree level) partition type, a luma or chroma component, and a size of each sub-block partitions.

Figure 7:
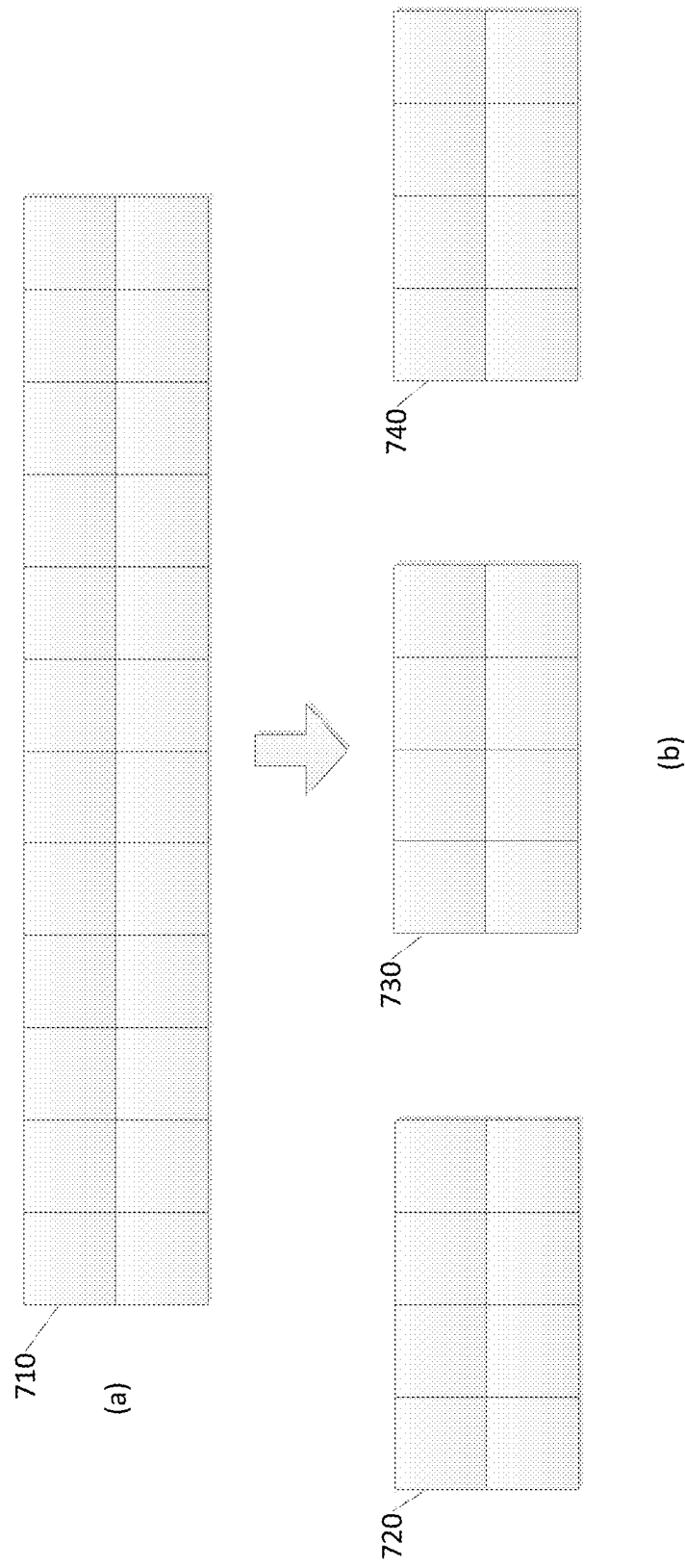
FIG. 7 is a diagram illustrating splitting of a non-power-of-2 block, according to another embodiment.

FIG. 7 is a diagram illustrating splitting of a non-power-of-2 block, according to another embodiment.

In an embodiment, a block having a width or height value is split to multiple sub-blocks each having a width or height that is a power of 2, and a number and a spatial order of these sub-blocks can be signaled or implicitly derived. In an example, for a block having a width or height of 12, the block may be split into two 8+4 sub-blocks, two 4+8 sub-blocks, or three 4+4+4 sub-blocks.

Referring to portions (a) and (b) of FIG. 7, a block 710 having a block width of 12, which is not a power of 2, may be split into three sub-blocks 720, 730 and 740 each having a width of 4.

In an example, a use of all sub-block splitting patterns is pre-defined for each block size.

In an embodiment, a block having a width or height value is split to multiple sub-blocks each having a width or height that is a power of 2, and a coding order of these sub-blocks can be signaled or implicitly derived based on the decoding information described above.

In an embodiment, for some block sizes, instead of doing a transform on each sub-block, the transform is only performed for selected blocks, and a reconstructed sample of a remaining block is derived by interpolating reconstructed samples of neighboring blocks.

In an example, for a block 50×64, the block is split horizontally into three 32×64, 4×64 and 16×64 sub-blocks. The 32×64 and 16×64 sub-blocks are coded first, then reconstructed samples of the middle 4×64 block are derived by interpolating from the reconstructed samples of the left 32×64 and right 16×64 blocks.

In an embodiment, one coded block flag (CBF) is signaled for a whole block, and a sub-block CBF may be further signaled for each sub-block to indicate whether there is at least one non-zero coefficient for the associated sub-block.

If the CBF of the whole block is 1, and a sub-block CBF of all preceding sub-blocks of a last sub-block in a coding order is 0, then a CBF of the last sub-block is not signaled but derived as 1.

In an embodiment, for some block sizes, instead of doing a transform on each sub-block, a transform is only performed for selected blocks, and a transform skip is applied for remaining blocks.

In an example, if a block is split to multiple sub-blocks, for sub-blocks larger than a size, a transform is applied, otherwise, a transform skip is applied. The block size is measured by a block width, a block height, a block area size, or a block width-to-height ratio.

In an embodiment, sub-blocks share a same type of a primary transform and/or a secondary transform, as indicated by a signaled primary transform index, e.g., an AMT index, and/or a secondary transform index.

In another embodiment, a sub-block uses a different type of a primary transform and/or secondary transform, and a selection depends on a relative location of the sub-block within a current block.

For a non-power-of-2 block width value M or height value N, a block is padded in a horizontal or vertical direction to reach a block width or height being closest but larger than a non-power-of-2 value of width or height.

In an embodiment, for a block having a width or height being N, the block width or height is padded to $2^{\lceil log_2(N) \rceil}$, e.g., when N is 6, 12, 20, 24, 28, 36, 40, 44, 48, 52, 56, or 60, the block width or height is padded to 8, 16, 32, 32, 32, 64, 64, 64, 64, 64, 64, or 64, respectively.

In an embodiment, where to pad samples, i.e., left or right, top or bottom, is signaled or fixed or implicitly derived.

In an embodiment, padded values can be a fixed value, e.g., 0 or 1<<(bitDepth−1), where bitDepth is a bit depth of picture samples.

In an embodiment, padded values may be derived using residual samples.

In an example, a padded value is an average value of all residual samples.

In another example, a padded value is an average value of a residual sample located in a same row or column.

In another example, a padded value is generated by extrapolating residual samples, e.g., residual samples located in a same row or column.

In another example, a padded values is derived by minimizing a transform energy located beyond a top-left M×N region of transform coefficients in a transform domain.

In an embodiment, after padding, a power-of-2 transform, which is larger than the block width or height before padding, is performed, all transform coefficients are signaled, and reconstructed residual samples or dequantized transform coefficients are further adjusted based on a method for padding the samples.

In an example, if padded residual sample values are derived as an average value of each row (column), after dequantization, in a transform domain, dequantized transform coefficients values are tuned within one quantization step size to minimize an absolute difference between reconstructed residual samples at padded positions, and an average value of each row (column) of reconstructed samples of a current block.

In an example, only top-left low frequency coefficients are tuned, and the low-frequency coefficients may be top-left M×N coefficients, where M and N are pre-defined integers for each block width and height. Alternatively, the low-frequency coefficients may be only a DC coefficient, only top-left AC coefficients, or coefficients larger than a pre-defined threshold.

In an embodiment, after padding, a power-of-2 transform, which is larger than a block width or height before padding, is performed, and a zero-out process is performed to remove all transform coefficients that are located beyond a top-left M×N, where M and N are a block width and a block height before padding.

In an embodiment, it is restricted that a non-power-of-2 block can be only inter coded, not intra coded.

When partitioning a block denoted by A, if this block A, of which each a height and a width is a power of 2, is further split as multiple sub-blocks (denoted by a0, a1, . . . ) and at least one of partitions a0, a1, . . . is not a power of 2, it is restricted that an overlapped transform is performed on the whole block A, meaning, the transform overlaps with the multiple sub-blocks, i.e., a0, a1, . . . . In this way, one transform is done for the whole block A, so that the transform is always done in a power of 2 basis. Here, an overlapped transform means a single transform covering multiple sub-block partitions though there is no overlapped region for those sub-block partitions.

In an embodiment, it is restricted that a non-power-of-2 block must be associated with either a zero CBF or only a DC value.

Transforms for sizes of multiple N×$2^M$ are supported, where M and N are integers, and N is not a power of 2.

In an example, N is 3, such that a 3-point, 6-point, 12-point, . . . transform is supported.

In an embodiment, because a N×$2^M$ transform is supported, more transform sizes are supported, and the N×$2^M$ can be applied such that a number of sub-blocks is further reduced. For example, when a 3×$2^M$ transform is supported, for a block having a width or height being 6, 12, 20, 24, 28, 36, 40, 44, 48, 52, 56, or 60, the block is split into 6, 12, 16+4, 16+8, 16+12, 32+4, 32+8, 32+12, 32+16, 48+4, 48+8 and 48+12 sub-blocks horizontally or vertically.

A number of a transform size is constrained such that it is less than a number of a valid CU width or height, where the CU width is less than or equal to a max transform size and the CU height is less than or equal to the max transform size.

In an embodiment, a certain transform size is not allowed.

In an example, a transform size is not allowed if the size cannot be represented as a sum of two numbers that are each a power of 2, such as 28 is not allowed by this constraint. In this case, a block with such a width or height has to use more than one sub-transform.

In another example, transforms with sizes N×$2^M$ are needed, where M and N are integers, and N is not a power of 2. To reduce a number for transforms, only an odd number of M is allowed, such as a transform size 6, 24, or 48. When a transform size is needed but not allowed, such as 12, the transform is split into smaller allowed transforms.

Figure 8:
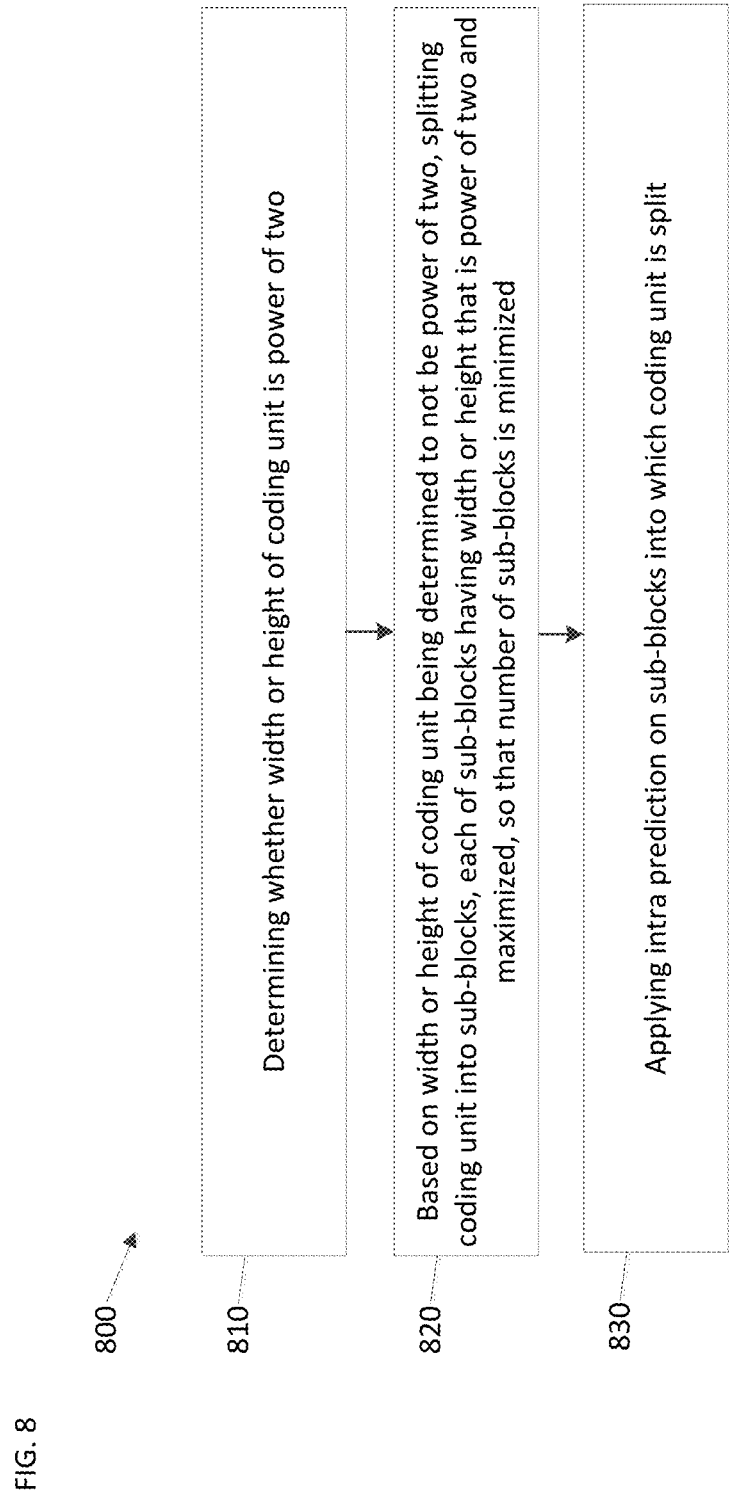
FIG. 8 is a flowchart illustrating a method of controlling intra and/or inter prediction for decoding of a video sequence, according to an embodiment.

FIG. 8 is a flowchart illustrating a method (800) of controlling intra and/or inter prediction for decoding of a video sequence, according to an embodiment. In some implementations, one or more process blocks of FIG. 8 may be performed by the decoder (310). In some implementations, one or more process blocks of FIG. 8 may be performed by another device or a group of devices separate from or including the decoder (310), such as the encoder (303).

Referring to FIG. 8, in a first block (810), the method (800) includes determining whether a width or a height of a coding unit is a power of two.

In a second block (820), the method (800) includes based on the width or the height of the coding unit being determined to not be a power of two, splitting the coding unit into sub-blocks, each of the sub-blocks having a width or a height that is a power of two and maximized, so that a number of the sub-blocks is minimized.

The splitting may include, based on the width or the height of the coding unit being determined to be 6, 12, 20, 24, 28, 36, 40, 44, 48, 52, 56 or 60, splitting the coding unit into the sub-blocks having widths or heights of 4+2, 8+4, 16+4, 16+8, 16+8+4, 32+4, 32+8, 32+8+4, 32+16, 32+16+4, 32+16+8, or 32+16+8+4, respectively, where M+N+K+J respectively denotes the widths or the heights of the sub-blocks.

The method (800) may further include determining a spatial order of the sub-blocks into which the coding unit is split, based on any one or any combination of a signal, sizes of one or more neighboring blocks of the sub-blocks, a location of each of the sub-blocks in a coding tree unit, a partition type of one or more parent blocks of the sub-blocks, a luma or chroma component of each of the sub-blocks, and the width or the height of each of the sub-blocks.

The splitting may include, based on the width or the height of the coding unit being determined to not be a power of two, determining the number of the sub-blocks into which the coding unit is to be split, based on any one or any combination of a signal, sizes of one or more neighboring blocks of the sub-blocks, a location of each of the sub-blocks in a coding tree unit, a partition type of one or more parent blocks of the sub-blocks, a luma or chroma component of each of the sub-blocks, the width or the height of each of the sub-blocks, and predetermined patterns respectively for splitting sizes of coding units, and splitting the coding unit into the sub-blocks, further based on the determined number of the sub-blocks.

In a third block (830), the method (800) includes applying the intra and/or inter prediction on the sub-blocks into which the coding unit is split.

The method (800) may further include determining an order in which the sub-blocks are to be coded, based on any one or any combination of a signal, sizes of one or more neighboring blocks of the sub-blocks, a location of each of the sub-blocks in a coding tree unit, a partition type of one or more parent blocks of the sub-blocks, a luma or chroma component of each of the sub-blocks, and the width or the height of each of the sub-blocks.

The method (800) may further include setting a first CBF for the coding unit, the first CBF indicating whether there is a non-zero coefficient for the coding unit, and setting a second CBF for each of the sub-blocks, the second CBF indicating whether there is a non-zero coefficient for a respective one of the sub-blocks.

The method (800) may further include, based on the first CBF for the coding unit being set to 1, and the second CBF for preceding ones of the sub-blocks preceding a last one of the sub-blocks in a coding order being set to 0, setting, to 1, the second CBF for the last one of the sub-blocks.

The method (800) may further include, based on a size of one of the sub-blocks, applying a transform to the one of the sub-blocks. The size of the one of the sub-blocks may include any one or any combination of the width, the height, an area, and a ratio of the width to the height of the one of the sub-blocks.

The method (800) may further include, based on a location of one of the sub-blocks in the coding unit, selecting one of a plurality of transforms, and applying the selected one of the plurality of transforms, to the one of the sub-blocks.

The method (800) may further include, based on the width or the height of the coding unit being determined to not be a power of two, applying only inter prediction on the coding unit.

The method (800) may further include, based on each of the width and the height of the coding unit being determined to be a power of two, splitting the coding unit into partitions, determining whether a width or a height of any one or any combination of the partitions is a power of two, and based on the width or the height of the any one or any combination of the partitions being determined to not be a power of two, applying a transform to the coding unit.

The method (800) may further include, based on the width or the height of the coding unit being determined to not be a power of two, setting, to 0, a CBF for the coding unit, the first CBF indicating whether there is a non-zero coefficient for the coding unit, or associating the coding unit with a DC value indicating a prediction value of a prediction block.

Although FIG. 8 shows example blocks of the method (800), in some implementations, the method (800) may include additional blocks, fewer blocks, different blocks, or differently arranged blocks than those depicted in FIG. 8. Additionally, or alternatively, two or more of the blocks of the method (800) may be performed in parallel.

Further, the proposed methods may be implemented by processing circuitry (e.g., one or more processors or one or more integrated circuits). In an example, the one or more processors execute a program that is stored in a non-transitory computer-readable medium to perform one or more of the proposed methods.

Figure 9:
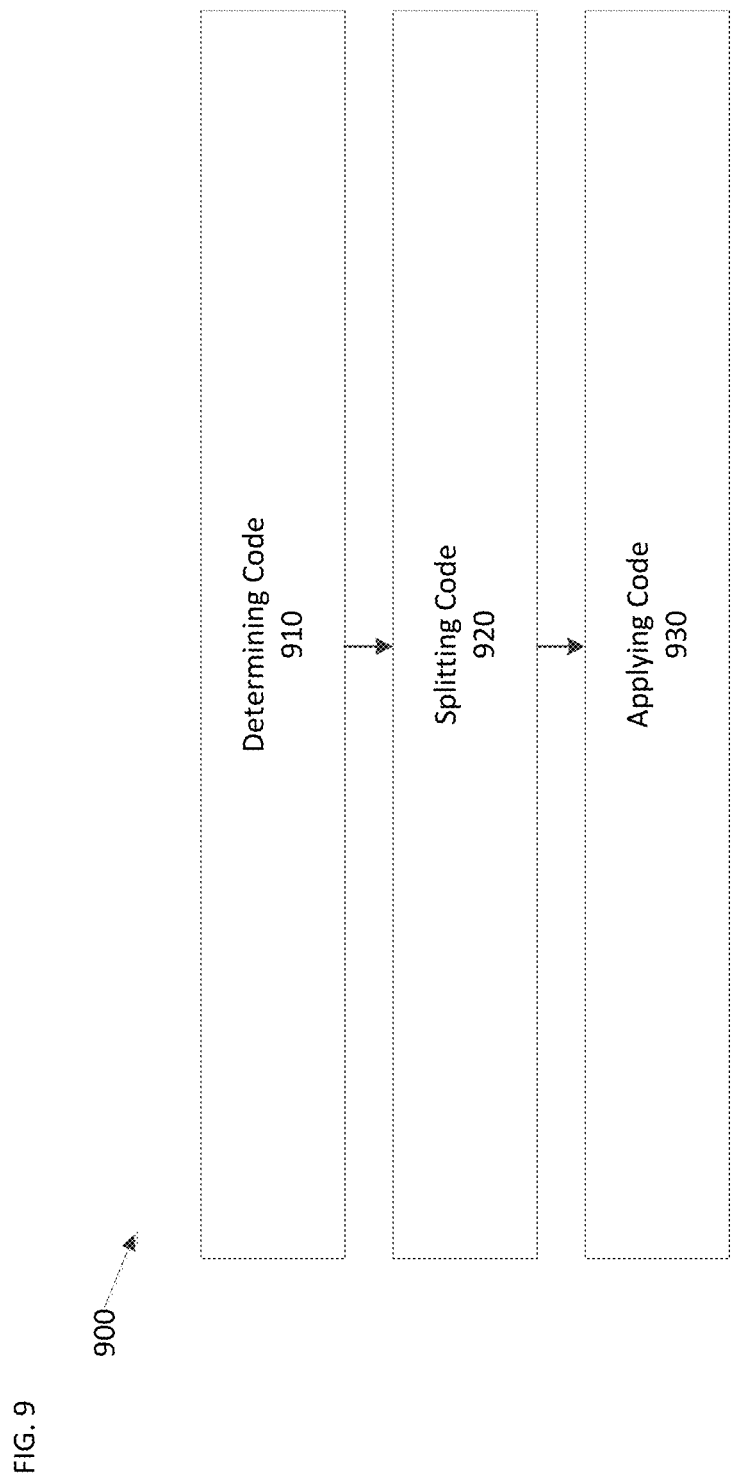
FIG. 9 is a simplified block diagram of an apparatus for controlling intra and/or inter prediction for decoding of a video sequence, according to an embodiment.

FIG. 9 is a simplified block diagram of an apparatus (900) for controlling intra and/or inter prediction for decoding of a video sequence, according to an embodiment.

Referring to FIG. 9, the apparatus (900) includes determining code (910) (first determining code), splitting code (920), and applying code (930) (first applying code).

The determining code (910) is configured to determine whether a width or a height of a coding unit is a power of two.

The splitting code (920) is configured to, based on the width or the height of the coding unit being determined to not be a power of two, split the coding unit into sub-blocks, each of the sub-blocks having a width or a height that is a power of two and maximized, so that a number of the sub-blocks is minimized.

The splitting code (920) is further configured to, based on the width or the height of the coding unit being determined to be 6, 12, 20, 24, 28, 36, 40, 44, 48, 52, 56 or 60, split the coding unit into the sub-blocks having widths or heights of 4+2, 8+4, 16+4, 16+8, 16+8+4, 32+4, 32+8, 32+8+4, 32+16, 32+16+4, 32+16+8, or 32+16+8+4, respectively, where M+N+K+J respectively denotes the widths or the heights of the sub-blocks.

The splitting code (920) is further configured to determine a spatial order of the sub-blocks into which the coding unit is split, based on any one or any combination of a signal, sizes of one or more neighboring blocks of the sub-blocks, a location of each of the sub-blocks in a coding tree unit, a partition type of one or more parent blocks of the sub-blocks, a luma or chroma component of each of the sub-blocks, and the width or the height of each of the sub-blocks.

The splitting code (920) is further configured to, based on the width or the height of the coding unit being determined to not be a power of two, determine the number of the sub-blocks into which the coding unit is to be split, based on any one or any combination of a signal, sizes of one or more neighboring blocks of the sub-blocks, a location of each of the sub-blocks in a coding tree unit, a partition type of one or more parent blocks of the sub-blocks, a luma or chroma component of each of the sub-blocks, the width or the height of each of the sub-blocks, and predetermined patterns respectively for splitting sizes of coding units, and split the coding unit into the sub-blocks, further based on the determined number of the sub-blocks.

The applying code (930) is configured to apply the intra and/or inter prediction on the sub-blocks into which the coding unit is split.

The apparatus may further include second determining code configured to determine an order in which the sub-blocks are to be coded, based on any one or any combination of a signal, sizes of one or more neighboring blocks of the sub-blocks, a location of each of the sub-blocks in a coding tree unit, a partition type of one or more parent blocks of the sub-blocks, a luma or chroma component of each of the sub-blocks, and the width or the height of each of the sub-blocks.

The apparatus may further include setting code configured to set a first CBF for the coding unit, the first CBF indicating whether there is a non-zero coefficient for the coding unit, and set a second CBF for each of the sub-blocks, the second CBF indicating whether there is a non-zero coefficient for a respective one of the sub-blocks.

The setting code may be further configured to, based on the first CBF for the coding unit being set to 1, and the second CBF for preceding ones of the sub-blocks preceding a last one of the sub-blocks in a coding order being set to 0, set, to 1, the second CBF for the last one of the sub-blocks.

The apparatus may further include second applying code configured to cause the at least one processor to, based on a size of one of the sub-blocks, apply a transform to the one of the sub-blocks. The size of the one of the sub-blocks may include any one or any combination of the width, the height, an area, and a ratio of the width to the height of the one of the sub-blocks.

The apparatus may further include second applying code configured to, based on a location of one of the sub-blocks in the coding unit, select one of a plurality of transforms, and apply the selected one of the plurality of transforms, to the one of the sub-blocks.

The applying code (930) may be further configured to, based on the width or the height of the coding unit being determined to not be a power of two, apply only inter prediction on the coding unit.

The splitting code (920) may be further configured to, based on each of the width and the height of the coding unit being determined to be a power of two, split the coding unit into partitions. The determining code (910) may be further configured to determine whether a width or a height of any one or any combination of the partitions is a power of two. The apparatus may further include second applying code configured to, based on the width or the height of the any one or any combination of the partitions being determined to not be a power of two, apply a transform to the coding unit.

The apparatus may further include setting code configured to, based on the width or the height of the coding unit being determined to not be a power of two, set, to 0, a CBF for the coding unit, the first CBF indicating whether there is a non-zero coefficient for the coding unit, or associate the coding unit with a DC value indicating a prediction value of a prediction block.

The techniques described above, can be implemented as computer software using computer-readable instructions and physically stored in one or more computer-readable media.

FIG. 10 is a diagram of a computer system (1000) suitable for implementing embodiments.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 10 for computer system (1000) are exemplary in nature and are not intended to suggest any limitation as to the scope of use or functionality of the computer software implementing embodiments. Neither should the configuration of components be interpreted as having any dependency or requirement relating to any one or combination of components illustrated in the exemplary embodiment of a computer system (1000).

Computer system (1000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1001), mouse (1002), trackpad (1003), touch screen (1010), data-glove (1004), joystick (1005), microphone (1006), scanner (1007), camera (1008).

Computer system (1000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1010), data-glove (1004), or joystick (1005), but there can also be tactile feedback devices that do not serve as input devices), audio output devices (such as: speakers (1009), headphones (not depicted)), visual output devices (such as screens (1010) to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1000) can also include human accessible storage devices and their associated media such as optical media including CD/DVD ROM/RW (1020) with CD/DVD or the like media (1021), thumb-drive (1022), removable hard drive or solid state drive (1023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1000) can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses ((1049)) (such as, for example universal serial bus (USB) ports of the computer system (1000); others are commonly integrated into the core of the computer system (1000) by attachment to a system bus as described below (for example Ethernet interface into a PC computer system or cellular network interface into a smartphone computer system). Using any of these networks, computer system (1000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1040) of the computer system (1000).

The core (1040) can include one or more Central Processing Units (CPU) (1041), Graphics Processing Units (GPU) (1042), specialized programmable processing units in the form of Field Programmable Gate Areas (FPGA) (1043), hardware accelerators (1044) for certain tasks, and so forth. These devices, along with Read-only memory (ROM) (1045), Random-access memory (RAM) (1046), internal mass storage such as internal non-user accessible hard drives, solid-state drives (SSDs), and the like (1047), may be connected through a system bus (1048). In some computer systems, the system bus (1048) can be accessible in the form of one or more physical plugs to enable extensions by additional CPUs, GPU, and the like. The peripheral devices can be attached either directly to the core's system bus (1048), or through a peripheral bus (1049). Architectures for a peripheral bus include peripheral component interconnect (PCI), USB, and the like.

CPUs (1041), GPUs (1042), FPGAs (1043), and accelerators (1044) can execute certain instructions that, in combination, can make up the aforementioned computer code. That computer code can be stored in ROM (1045) or RAM (1046). Transitional data can also be stored in RAM (1046), whereas permanent data can be stored for example, in the internal mass storage (1047). Fast storage and retrieve to any of the memory devices can be enabled through the use of cache memory, that can be closely associated with one or more CPU (1041), GPU (1042), mass storage (1047), ROM (1045), RAM (1046), and the like.

The computer readable media can have computer code thereon for performing various computer-implemented operations. The media and computer code can be those specially designed and constructed for the purposes of embodiments, or they can be of the kind well known and available to those having skill in the computer software arts.

As an example and not by way of limitation, the computer system having architecture (1000), and specifically the core (1040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1040) that are of non-transitory nature, such as core-internal mass storage (1047) or ROM (1045). The software implementing various embodiments can be stored in such devices and executed by core (1040). A computer-readable medium can include one or more memory devices or chips, according to particular needs. The software can cause the core (1040) and specifically the processors therein (including CPU, GPU, FPGA, and the like) to execute particular processes or particular parts of particular processes described herein, including defining data structures stored in RAM (1046) and modifying such data structures according to the processes defined by the software. In addition or as an alternative, the computer system can provide functionality as a result of logic hardwired or otherwise embodied in a circuit (for example: accelerator (1044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. Embodiments encompass any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method of controlling intra and/or inter prediction for decoding of a video sequence, the method being performed by at least one processor, and the method comprising:
   determining whether a width or a height of a coding unit is a power of two;
   based on the width or the height of the coding unit being determined to not be a power of two:
      splitting the coding unit into sub-blocks, each of the sub-blocks having a width or a height that is a power of two and maximized, so that a number of the sub-blocks is minimized;
      applying a transform on one or more of the sub-blocks into which the coding unit is split;
      generating reconstructed samples of a remaining one of the sub-blocks into which the coding unit is split, without applying the transform to the remaining one of the sub-blocks into which the coding unit is split, by interpolating reconstructed samples of the one or more sub-blocks to which the transform is applied;
      applying the intra and/or inter prediction on the sub-blocks into which the coding unit is split;
   based on each of the width and the height of the coding unit being determined to be a power of two:
      splitting the coding unit into partitions;
      determining whether a width or a height of any one of the partitions into which the coding unit is split, is a power of two;
      based on the width or the height of the any one of the partitions into which the coding unit is split, being determined to not be a power of two, applying a single transform to a whole of the coding unit without the coding unit being split into the partitions, so that the single transform covers the partitions and is used in a power of two basis; and
      based on the width or the height of each of the partitions into which the coding unit is split, being determined to be a power of two, applying a plurality of transforms respectively to the partitions into which the coding unit is split.

2. The method of claim 1, wherein the splitting comprises, based on the width or the height of the coding unit being determined to be 6, 12, 20, 24, 28, 36, 40, 44, 48, 52, 56 or 60, splitting the coding unit into the sub-blocks having widths or heights of 4+2, 8+4, 16+4, 16+8, 16+8+4, 32+4, 32+8, 32+8+4, 32+16, 32+16+4, 32+16+8, or 32+16+8+4, respectively.

3. The method of claim 1, further comprising determining a spatial order of the sub-blocks into which the coding unit is split, based on sizes of one or more neighboring blocks of the sub-blocks, a location of each of the sub-blocks in a coding tree unit, a partition type of one or more parent blocks of the sub-blocks, a luma or chroma component of each of the sub-blocks, and the width or the height of each of the sub-blocks.

4. The method of claim 1, wherein the splitting comprises, based on the width or the height of the coding unit being determined to not be a power of two:
   determining the number of the sub-blocks into which the coding unit is to be split, based on sizes of one or more neighboring blocks of the sub-blocks, a location of each of the sub-blocks in a coding tree unit, a partition type of one or more parent blocks of the sub-blocks, a luma or chroma component of each of the sub-blocks, the width or the height of each of the sub-blocks, and predetermined patterns respectively for splitting sizes of coding units; and
   splitting the coding unit into the sub-blocks, further based on the determined number of the sub-blocks.

5. The method of claim 1, further comprising determining an order in which the sub-blocks are to be coded, based on sizes of one or more neighboring blocks of the sub-blocks, a location of each of the sub-blocks in a coding tree unit, a partition type of one or more parent blocks of the sub-blocks, a luma or chroma component of each of the sub-blocks, and the width or the height of each of the sub-blocks.

6. The method of claim 1, further comprising:
   setting a first coded block flag (CBF) for the coding unit, the first CBF indicating whether there is a non-zero coefficient for the coding unit; and
   setting a second CBF for each of the sub-blocks, the second CBF indicating whether there is a non-zero coefficient for a respective one of the sub-blocks.

7. The method of claim 6, further comprising, based on the first CBF for the coding unit being set to 1, and the second CBF for preceding ones of the sub-blocks preceding a last one of the sub-blocks in a coding order being set to 0, setting, to 1, the second CBF for the last one of the sub-blocks.

8. The method of claim 1, further comprising:
   based on a size of one of the sub-blocks being larger than a size, applying one of the plurality of transforms to the one of the sub-blocks, wherein the size of the one of the sub-blocks includes any one or any combination of the width, the height, an area, and a ratio of the width to the height of the one of the sub-blocks; and
   based on the size of the one of the sub-blocks being not larger than the size, skipping the applying of the one of the plurality of transforms to the one of the sub-blocks.

9. The method of claim 1, further comprising:
   based on a location of one of the sub-blocks in the coding unit, selecting one of the plurality of transforms; and
   applying the selected one of the plurality of transforms, to the one of the sub-blocks.

10. The method of claim 1, further comprising, based on the width or the height of the coding unit being determined to not be a power of two, applying only inter prediction on the coding unit.

11. The method of claim 1, further comprising, based on the width or the height of the coding unit being determined to not be a power of two:
   setting, to 0, a coded block flag (CBF) for the coding unit, the first CBF indicating whether there is a non-zero coefficient for the coding unit; or
   associating the coding unit with a DC value indicating a prediction value of a prediction block.

12. An apparatus for controlling intra and/or inter prediction for decoding of a video sequence, the apparatus comprising:
   at least one memory configured to store computer program code; and at least one processor configured to access the at least one memory and operate according to the computer program code, the computer program code comprising:
    first determining code configured to cause the at least one processor to determine whether a width or a height of a coding unit is a power of two;
    splitting code configured to cause the at least one processor to, based on the width or the height of the coding unit being determined to not be a power of two, split the coding unit into sub-blocks, each of the sub-blocks having a width or a height that is a power of two and maximized, so that a number of the sub-blocks is minimized; and
    first applying code configured to cause the at least one processor to:
        apply a transform on one or more of the sub-blocks into which the coding unit is split;
        generate reconstructed samples of a remaining one of the sub-blocks into which the coding unit is split, without applying the transform to the remaining one of the sub-blocks into which the coding unit is split, by interpolating reconstructed samples of the one or more sub-blocks to which the transform is applied; and
        apply the intra and/or inter prediction on the sub-blocks into which the coding unit is split,
    wherein the splitting code is further configured to cause the at least one processor to, based on each of the width and the height of the coding unit being determined to be a power of two, split the coding unit into partitions, and
    wherein the first applying code is further configured to cause the at least one processor to:
        determine whether a width or a height of any one of the partitions into which the coding unit is split, is a power of two;
        based on the width or the height of the any one of the partitions into which the coding unit is split, being determined to not be a power of two, apply a single transform to a whole of the coding unit without the coding unit being split into the partitions, so that the single transform covers the partitions and is used in a power of two basis; and
        based on the width or the height of each of the partitions into which the coding unit is split, being determined to be a power of two, apply a plurality of transforms respectively to the partitions into which the coding unit is split.

13. The apparatus of claim 12, wherein the splitting code is further configured to cause the at least one processor to, based on the width or the height of the coding unit being determined to be 6, 12, 20, 24, 28, 36, 40, 44, 48, 52, 56 or 60, split the coding unit into the sub-blocks having widths or heights of 4+2, 8+4, 16+4, 16+8, 16+8+4, 32+4, 32+8, 32+8+4, 32+16, 32+16+4, 32+16+8, or 32+16+8+4, respectively.

14. The apparatus of claim 12, wherein the splitting code is further configured to cause the at least one processor to determine a spatial order of the sub-blocks into which the coding unit is split, based on any one or sizes of one or more neighboring blocks of the sub-blocks, a location of each of the sub-blocks in a coding tree unit, a partition type of one or more parent blocks of the sub-blocks, a luma or chroma component of each of the sub-blocks, and the width or the height of each of the sub-blocks.

15. The apparatus of claim 12, wherein the splitting code is further configured to cause the at least one processor to, based on the width or the height of the coding unit being determined to not be a power of two:
    determine the number of the sub-blocks into which the coding unit is to be split, based on sizes of one or more neighboring blocks of the sub-blocks, a location of each of the sub-blocks in a coding tree unit, a partition type of one or more parent blocks of the sub-blocks, a luma or chroma component of each of the sub-blocks, the width or the height of each of the sub-blocks, and predetermined patterns respectively for splitting sizes of coding units; and
    split the coding unit into the sub-blocks, further based on the determined number of the sub-blocks.

16. The apparatus of claim 12, further comprising second determining code configured to cause the at least one processor to determine an order in which the sub-blocks are to be coded, based on sizes of one or more neighboring blocks of the sub-blocks, a location of each of the sub-blocks in a coding tree unit, a partition type of one or more parent blocks of the sub-blocks, a luma or chroma component of each of the sub-blocks, and the width or the height of each of the sub-blocks.

17. The apparatus of claim 12, further comprising setting code configured to cause the at least one processor to:
    set a first coded block flag (CBF) for the coding unit, the first CBF indicating whether there is a non-zero coefficient for the coding unit; and
    set a second CBF for each of the sub-blocks, the second CBF indicating whether there is a non-zero coefficient for a respective one of the sub-blocks.

18. The apparatus of claim 12, further comprising second applying code configured to cause the at least one processor to:
    based on a size of one of the sub-blocks being larger than a size, apply one of the plurality of transforms to the one of the sub-blocks, wherein the size of the one of the sub-blocks includes any one or any combination of the width, the height, an area, and a ratio of the width to the height of the one of the sub-blocks; and
    based on the size of the one of the sub-blocks being not larger than the size, skip the applying of the one of the plurality of transforms to the one of the sub-blocks.

19. A non-transitory computer-readable storage medium storing instructions that cause a processor to:
    determine whether a width or a height of a coding unit is a power of two;
    based on the width or the height of the coding unit being determined to not be a power of two:
        split the coding unit into sub-blocks, each of the sub-blocks having a width or a height that is a power of two and maximized, so that a number of the sub-blocks is minimized;
        apply a transform on one or more of the sub-blocks into which the coding unit is split;
        generate reconstructed samples of a remaining one of the sub-blocks into which the coding unit is split, without applying the transform to the remaining one of the sub-blocks into which the coding unit is split, by interpolating reconstructed samples of the one or more of the sub-blocks to which the transform is applied; and
        apply intra and/or inter prediction for decoding of a video sequence, on the sub-blocks into which the coding unit is split,
    based on each of the width and the height of the coding unit being determined to be a power of two:
        split the coding unit into partitions;

determine whether a width or a height of any one of the partitions into which the coding unit is split, is a power of two;

based on the width or the height of the any one of the partitions into which the coding unit is split, being determined to not be a power of two, apply a single transform to a whole of the coding unit without the coding unit being split into the partitions, so that the single transform covers the partitions and is used in a power of two basis; and based on the width or the height of each of the partitions into which the coding unit is split, being determined to be a power of two, apply a plurality of transforms respectively to the partitions into which the coding unit is split.

20. The non-transitory computer-readable storage medium of claim 19, wherein the instructions further cause the processor to:

apply the transform on a left sub-block and a right sub-block among the sub-blocks into which the coding unit is split; and interpolate reconstructed samples of a middle sub-block among the sub-blocks into which the coding unit is split, without applying the transform to the middle sub-block among the sub-blocks into which the coding unit is split.

* * * * *